(No Model.)

J. J. WOLF.
BOX STRAP.

No. 539,845.  Patented May 28, 1895.

Witnesses:

Inventor:
Julius J. Wolf,
By, Higdon & Higdon,
Attorneys

UNITED STATES PATENT OFFICE.

JULIUS J. WOLF, OF KANSAS CITY, MISSOURI, ASSIGNOR OF THREE-EIGHTHS TO SOPHIA C. AXMAN, OF SAME PLACE.

BOX-STRAP.

SPECIFICATION forming part of Letters Patent No. 539,845, dated May 28, 1895.

Application filed January 28, 1895. Serial No. 536,416. (No model.)

*To all whom it may concern:*

Be it known that I, JULIUS J. WOLF, of Kansas City, Jackson county, Missouri, have invented certain new and useful Improvements in Case or Box Straps, of which the following is a full, clear, and exact description, reference being had to the accompanying drawings, forming a part hereof.

My invention relates to case and box straps, and has for its object to provide a device of this character which may be easily and quickly secured in or removed from position around a case or box, but which cannot accidentally be disengaged from position.

A further object of the invention is to provide a device of this character which is simple, strong, durable and cheap of construction.

To the above purposes, my invention consists in certain novel and peculiar features of construction and arrangement, as hereinafter described and claimed.

In order that the invention may be fully understood, reference is to be had to the accompanying drawings, in which—

Figure 1:
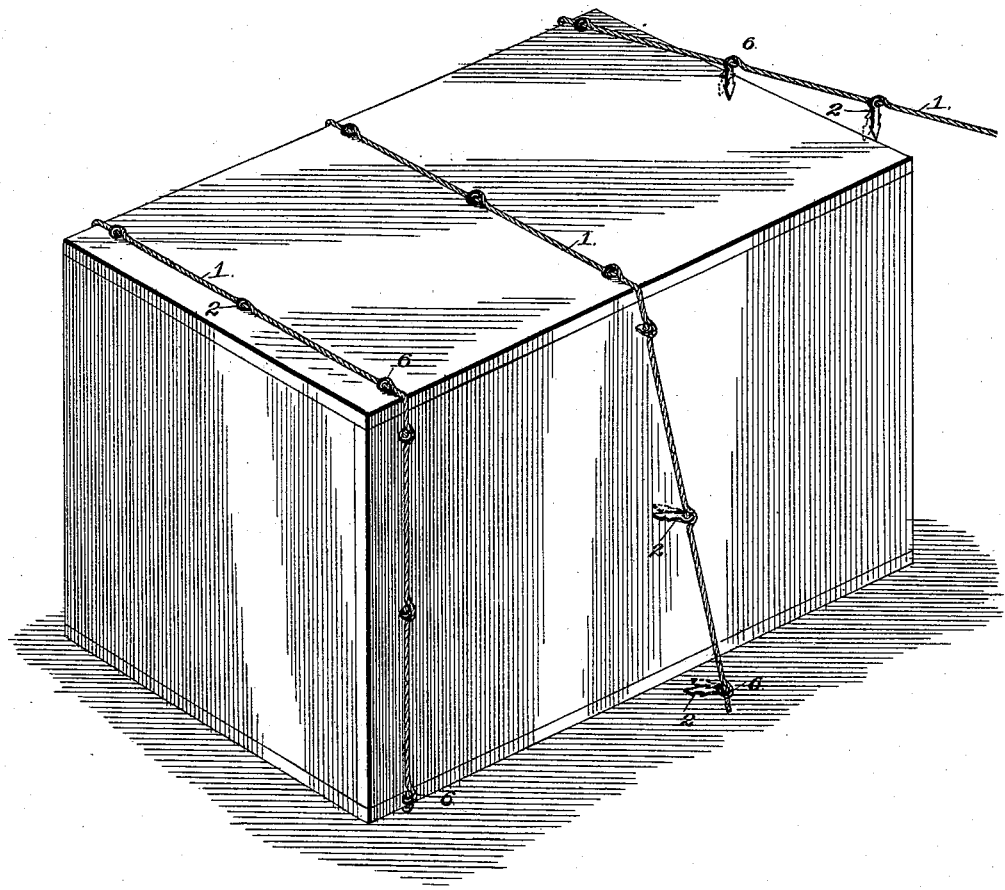
Figure 2:
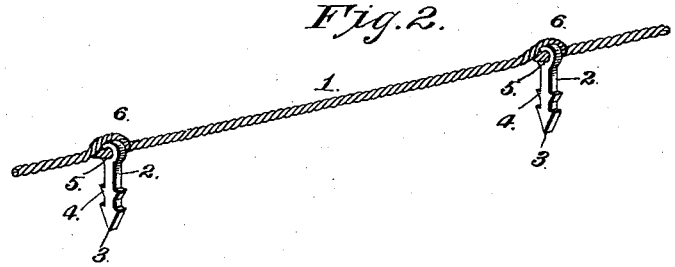

Figure 1 represents a perspective view of a case or box provided with securing-straps embodying my invention. Fig. 2 represents in perspective a portion of one of the securing straps.

In the said drawings, 1 designates a flexible strap constructed of a wire or twisted wires of any suitable material, and 2 designates spikes or arms projecting from the same. Each spike or arm is provided with a sharpened barbed lower end or head 3, and may also be provided with additional barbs or lugs 4. These spikes or arms are stamped from sheet metal by means of dies (not shown), of corresponding contour, or may be wrought or cast metal, and said spikes or arms are formed each with an opening 5, in its upper end, which is engaged by the flexible wire or twisted wires by looping the same through the said openings of the spikes, as shown at 6.

To secure a case or box firmly together, and obviate entirely the employment of nails or equivalent devices, I arrange one or more of these straps in the proper position relative to the case or box,—for instance, in the position shown by portions of the straps in Fig. 1, and I preferably arrange each spike, when about to be driven into the case or box so as to incline forward relatively to the strap, as shown in Fig. 1, in full lines. A hammer is now brought down sharply upon the upper end of one of the said barbed spikes or arms, which is thus driven home into the case or box, and owing to the fact that it is arranged and held at a slight forward inclination, it exerts a forwardly pulling strain upon the strap. The hammer is now brought sharply down upon the contiguous barbed spike in advance of the one previously driven home, and this operation causes, as will be readily understood, the said barbed spike or arm to enter the case or box and to exert a similar forwardly pulling strain upon the strap, so as to take up any slack rearward thereof, and to clamp the strap flatly and firmly upon the box. This operation is continued successively until all of the spikes or arms are driven home and the case or box is completely incased, as shown in Fig. 1. Owing to the fact that said spikes or arms are barbed, it is obvious that it will be impossible for said straps to become disengaged accidentally from the case or box. It is to be understood that these spikes or arms may be provided with any number of barbs found desirable in practice, and that I contemplate manufacturing them in various sizes.

From the above description, it will be apparent that I have produced a case or box strap which will be found very serviceable in securing large cases or boxes, or barrels, containing dry goods, crockery, &c., and that it will be found serviceable in various other connections, not necessary to enumerate herein.

Having thus described my invention, what I claim as new, and desire to secure by Letters Patent, is—

A case or box strap, comprising a number of spikes or arms 2, having sharpened barbed heads 3 at their lower ends, and apertures or openings 5 in their upper ends, and a flexible wire provided at intervals with loops which engage each the aperture or opening in the upper end of one of said spikes or arms, substantially as described.

In testimony whereof I affix my signature in the presence of two witnesses.

JULIUS J. WOLF.

Witnesses:
M. R. REMLEY,
G. Y. THORPE.